United States Patent
Namerikawa et al.

(10) Patent No.: US 6,523,423 B1
(45) Date of Patent: Feb. 25, 2003

(54) FORCE SENSOR

(75) Inventors: Masahiko Namerikawa, Seto (JP); Kazuyoshi Shibata, Mizunami (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/460,019

(22) Filed: Dec. 13, 1999

(30) Foreign Application Priority Data

Dec. 25, 1998 (JP) .......... 10-371561

(51) Int. Cl.$^7$ .......... G01L 5/04; G01L 5/10
(52) U.S. Cl. .......... 73/862.391; 73/862.41
(58) Field of Search .......... 73/862.04, 514.34, 73/862.7, 706; 345/365.4

(56) References Cited

U.S. PATENT DOCUMENTS

| | | | |
|---|---|---|---|
| 4,539,554 A | * 9/1985 | Jarvis et al. | 345/365 A |
| 4,964,302 A | * 10/1990 | Grahn et al. | 73/865.7 |
| 4,967,605 A | * 11/1990 | Okada | 73/862.04 |
| 4,984,468 A | * 1/1991 | Hafner | 29/595 |
| 5,255,427 A | * 10/1993 | Hafner | 156/89.11 |
| 5,365,799 A | 11/1994 | Okada | |
| 5,520,054 A | * 5/1996 | Romo | 73/715 |
| 5,571,972 A | 11/1996 | Okada | |
| 5,777,239 A | * 7/1998 | Fuglewicz | 73/862.625 |
| 5,811,684 A | * 9/1998 | Sokn | 73/706 |
| 5,948,996 A | * 9/1999 | Takeuchi et al. | 73/504.03 |
| 5,959,209 A | * 9/1999 | Takeuchi et al. | 73/514.34 |

FOREIGN PATENT DOCUMENTS

| | | |
|---|---|---|
| JP | 5-26744 | 2/1993 |
| JP | 8-94661 | 4/1996 |

OTHER PUBLICATIONS

Misch, F.C. et al. (1993). Meriam Webster's Collegiate Dictionary. Meriam–Webster Inc.*

* cited by examiner

Primary Examiner—Max Noori
Assistant Examiner—Lilybett Martir
(74) Attorney, Agent, or Firm—Burr & Brown

(57) ABSTRACT

A force sensor includes: a supporting base having a hollow portion, a flexible plate having at least one detecting element and extending across over the hollow portion, and an operating member suspended over the hollow portion by the flexible plate. Inclined strength is given to the flexible plate so that it becomes stronger from an arbitrary position between the outer periphery of the operating member and the inner periphery of the supporting base toward the outer periphery of the operating member and/or toward the inner periphery of the supporting base. Another force sensor includes: a supporting base having a hollow portion, a flexible plate having at least one detecting element and extending across over the hollow portion, and an operating member suspended over the hollow portion by the flexible plate. A boundary between the flexible plate and the operating member and/or a boundary between the flexible plate and the supporting base have (has) a curvature.

33 Claims, 7 Drawing Sheets

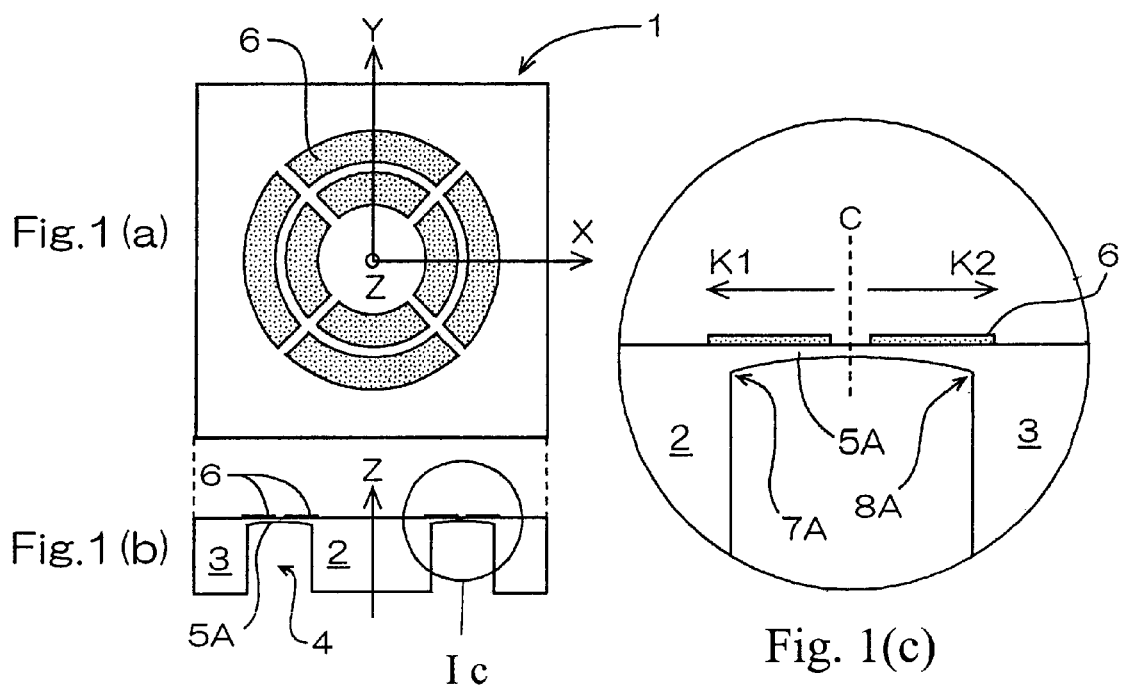
Fig.1(a)
Fig.1(b)
Fig. 1(c)
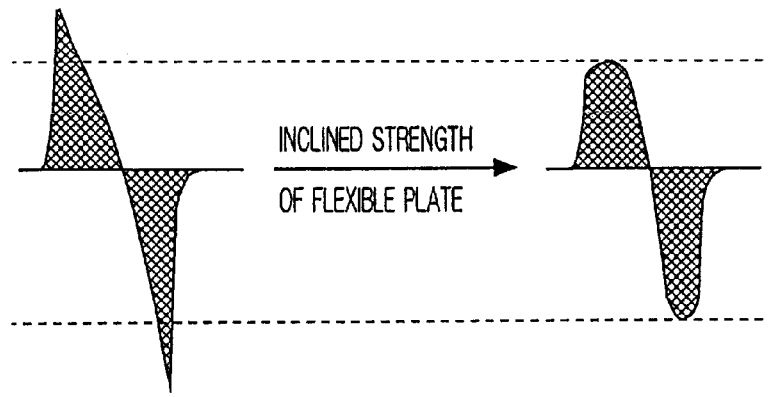
Fig.2
INCLINED STRENGTH OF FLEXIBLE PLATE

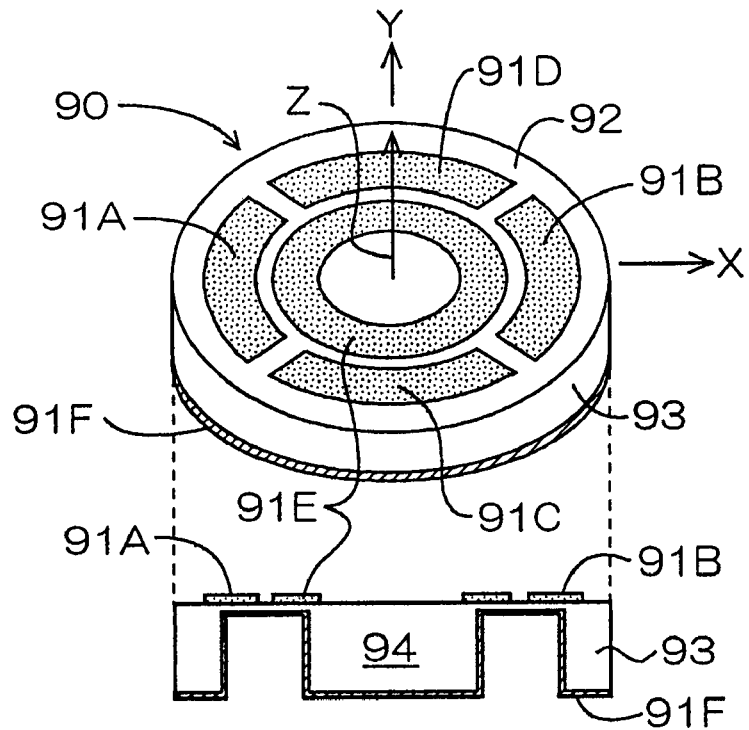
Fig.14(a) - Prior Art
Fig.14(b) - Prior Art
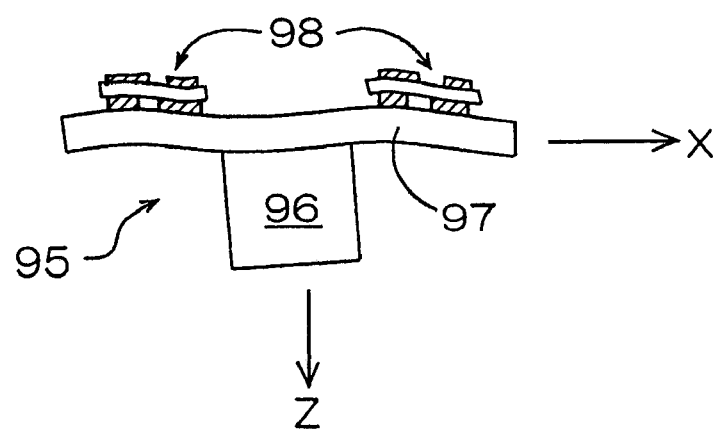
Fig.15 - Prior Art

FORCE SENSOR

BACKGROUND OF THE INVENTION AND RELATED ART STATEMENT

A present invention relates to an excellently reliable force sensor which can three-dimensionally detect the magnitude and the direction of a physical quantity by detecting displacement of an operating member or a strain caused in the flexible plate by the displacement of the operating member and aims to protect the flexible plate from being damaged / destroyed by the action of impulsive force applied suddenly or serious external force without deterioration of detection sensitivity.

There has been increasing a demand for sensors capable of accurately detecting a physical quantity such as acceleration, magnetism, or the like, in fields of an automobile and a mechanical industries. Particularly, there is a need for a small-sized sensor capable of detecting such a physical quantity for each of two- or three-dimensional components. For example, an acceleration sensor is used for a mechanism for automatically recovering a balance when an automobile lost its balance due to sudden wheeling, a side wind, or the like, a collision sensing mechanism, a mechanism for adjusting self-supporting stability of a crane, or the like, a mechanism for adjusting a flow rate of fluid or for opening and shutting a valve by sensing a change in a speed of fluid flowing through pipe, etc.

As such a sensor, Japanese Patent Laid-Open 5-26744 discloses a sensor 95 in which a plurality of piezoelectric element 98 are disposed on a flexible plate 97 suspending a weight 96 as shown in FIG. 15. In addition, as shown in FIG. 14, Japanese Patent Laid-Open 8-94661 discloses a sensor 90 in which a supporting base 98, a flexible plate 92, and a weight 94 disposed inside the sensor are unitarily formed using a piezoelectric material, one end surface of a cylindrical supporting base 93 is blocked up by the flexible plate 92, the columnar weight 94 is suspended by the flexible plate 92 at the center of a hollow portion of the supporting base 93, a plurality of upper electrodes 91A–91E are disposed on the surface of the flexible plate 92, and a lower electrode 91F is disposed on the lower surfaces of the supporting base 93, the flexible plate 92, and the weight 94.

These sensors are constituted so that the flexible plates are bent by a force corresponding to a physical quantity such as a direct force acting on the weight from outside, a force of inertia due to an acceleration and a magnetic attraction. The sensors can detect the magnitude and the direction of a physical quantity by detecting an electric charge generated in a piezoelectric body in accordance with bending of the flexible plate. Such a sensor is hereinbelow referred to as "a force sensor ".

In three-dimensional detection of a force, that is, in detection of a force in X, Y, and Z axial directions (hereinafter referred to as three axial directions) which shows rectangular coordinates, for example, in a sensor shown in FIG. 14, a displacement can be detected by a charge generated in the upper electrode 91E in the case that the weight 94 is displaced in the z-axial direction which is a direction of suspension of the weight 94. At this time, force in the X-axial direction and in the Y-axial direction is prevented from being detected by wiring so that the charges generated in the upper electrodes 91A and 91B offset each other and the charges generated in the upper electrodes 91C and 91D offset each other. In the same manner, a displacement in each of the directions can be measured by charges generated in the upper electrodes 91A and 91B when the weight 94 is displaced in the X-axial direction and charges generated in the upper electrodes 91C and 91D when the weight 94 is displaced in the Y-axial direction. Thus, when the weight 94 is displaced in any direction, the magnitude and the direction of an applied physical quantity can be known by synthesizes detected components in each axial direction.

The aforementioned force sensor uses a stress generated in the flexible plate by a displacement of the weight. When the stress exceeds the fracture strength of the flexible plate, a crack is caused in the flexible plate and results in breakage. For example, when a sensor is dropped and collides against the ground due to a mistake, or the like, an excessive acceleration is applied to the weight, which cause a crack in a boundary portion between the weight and the flexible plate. Thus, breakage of a sensor is sometimes caused.

In addition, when fatigue of the flexible plate advances due to a long-term use, breakage is sometimes caused even if the stress generated in the flexible plate does not reach the material fracture strength. This is because a kind, a shape, or the like, of a material for each member has conventionally been set up so that a desired detection sensitivity is obtained without breakage of the flexible plate when the maximum acceleration to be detected is given to the sensor.

By thickening the flexible plate to increase the strength, it is possible to avoid the breakage with a certain probability even if, for example, the aforementioned sudden serious external force acts. However, the flexible plate becomes difficult to bent in this case, and therefore sensitivity of the sensor is lowered.

For example, FIG. 16(*a*) shows an example of a result that a stress generated in the flexible plate 71 when an operating member 72 is displaced with 1G acceleration applied to the acceleration sensor 70 having a flexible plate 71 comprising a piezoelectric body, an operating member 72, a supporting base 73, and a structure of the same rank as that of the acceleration sensor 90 shown in FIG. 14 in Z-axial direction is obtained by FEM simulation. Here, there were used, as a parameter, a supporting base 73 made of zirconia and having an inner diameter of 3.5 mm, an operating member 72 made of zirconia and having a diameter of 1.8 mm and a thickness of 0.635 mm, and a flexible plate 71 having a zirconia plate having a thickness of 0.015 mm and a PZT element having a thickness of 0.02 mm superposed on the zirconia plate to have a film form. Physical properties of the zirconia and the PZT element used for the simulation are shown in Table 1.

TABLE 1

|  | Young's modulus ($10^6$ kg/cm$^2$) | Specific gravity |
| --- | --- | --- |
| Zirconia | 2 | 6.0 |
| PZT | 0.62 | 7.6 |

As shown by a curved line(stress line) showing a stress in FIG. 16(*a*), when an acceleration is given in the Z-axial direction, a large stress force is generated in the X-axial and Y-axial directions, and the stress line has a peak. This shows that the stress is concentrated in a narrow range of length (a transversal axis). Therefore, an acceleration sensor has conventionally designed so as to avoid breakage by adjusting thickness of a flexible plate as a whole so as not to exceed limit of breakage of the flexible plate by; for example, supposing that the maximum stress is excessive stress upon collision with the ground. However, this method cause a problem of deterioration in sensitivity of the sensor because a mode of generating stress is not changed, and therefore, if a peak value of the stress is set to be the same as or lower than the limit of breakage, whole magnitude of stress to be generated becomes small.

This is hereinbelow explained from another view point. The whole magnitude of stress shows a detecting sensitivity of a sensor, and an area surrounded by a stress curve and a transverse axis showing a length of a flexible plate expresses a detection sensitivity. Therefore, as shown in FIG. 16(b), a mode of generation of overall stress, that is, only a peak value becomes low without changing an outline having a peak shape, an area surrounded by the stress curve and the transverse axis becomes small, and a detecting sensitivity is lowered.

In a force sensor, it is important to improve productivity besides a problem of balance of the aforementioned sensitivity and reliability. The weight and the supporting base are required to have high rigidity to hardly bend to purely detect an acceleration, while the flexible plate is required to have high flexibility to obtain sufficient sensitivity. To satisfy these properties, it is possible to produce by assembling each of the weight, the supporting base, and the flexible plate. However, it is difficult to desire improvement in productivity because it requires many parts and processes.

SUMMARY OF THE INVENTION

The present invention has been made in view of the aforementioned problems of prior art and aims to obtain a force sensor which is excellent in reliability and productivity and which can obtain a desired detecting sensitivity with lowering a peak value of stress and without reducing the whole magnitude of stress generated in the flexible plate.

According to the present invention, there is provided a force sensor comprising:
a supporting base having a hollow portion,
a flexible plate having at least one detecting element and extending across over the hollow portion, and
an operating member suspended over the hollow portion by the flexible plate;
wherein inclined strength is given to the flexible plate so that it becomes stronger from an arbitrary position between the outer periphery of the operating member and the inner periphery of the supporting base toward the outer periphery of the operating member and/or toward the inner periphery of the supporting base.

It is preferable that the inclined strength is given to the flexible plate by giving an inclined thickness to the flexible plate so that it becomes thicker from an arbitrary position between the outer periphery of the operating member and the inner periphery of the supporting base toward the outer periphery of the operating member and/or toward the inner periphery of the supporting base.

A force sensor of the present invention includes a force sensor capable of detecting a force in only one-axial (linear) direction, a force sensor capable of detecting a force in arbitrary two-axial (plane) directions, and a force sensor capable of detecting a force in three-axial directions. A detecting direction by these force sensors can be selected by changing conditions of disposition or wiring of a detecting element.

In a force sensor of the present invention, there is preferably employed a method in which the inclined strength is given to the flexible plate by giving an inclined thickness to the flexible plate so that it becomes thicker from an arbitrary position between the outer periphery of the operating member and the inner periphery of the supporting base toward the outer periphery of the operating member and/or toward the inner periphery of the supporting base. A boundary between the flexible plate and the operating member and/or a boundary between the flexible plate and the supporting base preferably have(has) a curvature. The curvature of the boundary between the flexible plate and the operating member may be different from that of the boundary between the flexible plate and the supporting base.

A gradient of the thickness of the flexible plate from the arbitrary position between the outer periphery of the operating member and the inner periphery of the supporting base toward the outer periphery of the operating member are preferably different from that of the flexible plate from the arbitrary position between the outer periphery of the operating member and the inner periphery of the supporting base toward the inner periphery of the supporting base. Though the gradient of the thickness is preferably continuous, the flexible plate may be formed to have the inclined thickness arranged in tiers. When the flexible plate may be formed to have the inclined thickness arranged in tiers, it is possible and preferable to employ a green sheet lamination technique.

It is also preferable that the inclined strength is given to the flexible plate by giving an inclined composition to the flexible plate from an arbitrary position between the outer periphery of the operating member and the inner periphery of the supporting base toward the outer periphery of the operating member and/or toward the inner periphery of the supporting base. In this case, the inclined strength is preferably given to the flexible plate by giving an inclined composition to the flexible plate from an arbitrary position between the outer periphery of the operating member and the inner periphery of the supporting base toward both the outer periphery of the operating member and the inner periphery of the supporting base. A condition of the composite of the flexible plate from the arbitrary position between the outer periphery of the operating member and the inner periphery of the supporting base toward the outer periphery of the operating member may be different from that of the flexible plate from the arbitrary position between the outer periphery of the operating member and the inner periphery of the supporting base toward the inner periphery of the supporting base. Of course, inclined thickness and composition may be employed simultaneously.

According to the present invention, there is further provided a force sensor comprising:
a supporting base having a hollow portion,
a flexible plate having at least one detecting element and extending across over the hollow portion, and
an operating member suspended over the hollow portion by the flexible plate;
wherein a boundary between the flexible plate and the operating member and/or a boundary between the flexible plate and the supporting base have(has) a curvature.

In such a force sensor it is preferable that both a boundary between the flexible plate and the operating member and a boundary between the flexible plate and the supporting base have a curvature. It is also preferable that the curvature of the boundary between the flexible plate and the operating member is different from that of the boundary between the flexible plate and the supporting base. The boundary may be formed in tiers. In all the aforementioned force sensors of the present invention, a piezoelectric element is suitably used as the detecting element. The operating member, the supporting base, and the flexible plate are unitarily formed, and at least one of them has a different chemical composition from the others. By making only the flexible plate of a zirconia ceramic containing 0.1–0.6% by weight of titanium in terms of $TiO_2$ and/or 0.005–0.1% by weight of magnesium in terms of MgO, goof flexibility can be preferably obtained. By making only the flexible plate of a zirconia ceramic containing 0.2–0.5% by weight of titanium in terms of $TiO_2$ and/or 0.01–0.05% by weight of magnesium in terms of MgO, the better flexibility can be preferably obtained.

A hardness of a part of the detecting element formed on a part of or an entire surface of the flexible surface is preferably made higher in comparison with that of the other part by a hardening material so as to partially heighten strength of the flexible plate.

BRIEF DESCRIPTION OF THE DRAWINGS

FIGS. 1(a)(b) show an embodiment of a force sensor of the present invention. FIG. 1(a) is a plan view, and FIG. 1(b) is a sectioned view.

FIG. 2 is an explanatory view showing a change in mode of generation of stress of a flexible plate due to an inclined strength of the present invention.

FIGS. 14(a)(b) show an embodiment of a conventional force sensor. FIG. 14(a) is a perspective view, and FIG. 14(b) is a sectional view.

FIG. 15 is a sectional view showing another embodiment of a conventional force sensor.

DETAILED DESCRIPTION OF THE INVENTION

Figure 3:
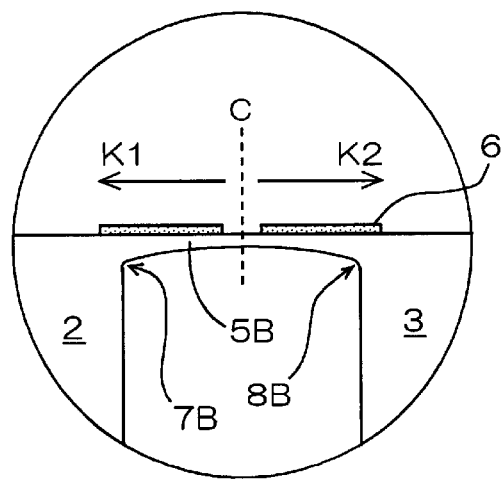
FIG. 3 is a sectional view showing another embodiment of a structure of a flexible plate in a force sensor of the present invention.

Embodiments of the present invention are hereinbelow described with reference to drawings taking as an example a piezoelectric element suitably employed as a detecting element in the present invention. By employing an operating member as a weight, these various kinds of force sensors can be suitably employed as an acceleration sensor which detects an acceleration acting from outside.

FIGS. 1(a)(b) are a plan view and a sectional view showing an embodiment of the force sensor (hereinbelow referred to as "sensor") of the present invention. The sensor is basically composed of a supporting base 3 having a hollow portion 4, a flexible plate 5 extending across over the hollow portion 4 of the supporting base 3, and an operating member 2 suspended over the hollow portion of the supporting base 3 by the flexible plate 5. A piezoelectric element 6 is disposed on the upper surface of a flexible plate 5A so as to locate mainly over the outer periphery of the operating member 2 and the inner pheriphery of the supporting base 3. The position of the piezoelectric element 6 can be decided in consideration of a range of generation of stress in FEM simulation previously shown in FIGS. 16(a)(b). Though the operating member 2 is suspended at the center of the hollow portion 4 (flexible plate 5) in the sensor 1, the position is not limited to the center.

In the sensor 1, it is laid down that a direction in which the weight 2 is suspended is the Z-axial direction, and the Z-axial direction is the upward and downward direction. The X axis and the Y axis are set in the direction perpendicular to the Z axis and in which the flexible plate 5A extends. The same manner for setting such axes could be employed for the various sensors to be described later.

Here, an operating member is a member which displaces by receiving a force from outside, and a supporting base is a member which serves as a base for holding the operating member and the flexible plate. Therefore, the operating member and the supporting base are preferably made of a material having high rigidity so as not to be deformed by a force, for example, ceramic or metal. If the operating member is made of a material having high specific weight, it can be more easily miniaturized.

The flexible plate is a plate-like member suspending an operating member and extending to the supporting base. The flexible plate bends based on a displacement of the operating member. Therefore, the easier the elastic displacement is, the more improved the sensitivity of the sensor is, as long as the flexible plate is not broken by the displacement of the operating member. Thus, the flexible plate preferably has high elastic displacement. Specifically, there can be used as a material metal, ceramic, glass, resin, or the like. Among these, ceramic is the best because it has high Young's modulus, it easily induces strain to the piezoelectric element, and it makes disposition of the piezoelectric element easy. If a metallic material is used for the flexible plate, insulation treatment against the piezoelectric element is required since the piezoelectric element has an electrode. The whole flexible plate may be constituted by a piezoelectric body.

A piezoelectric element is a member which generates voltage according to the stress generated by a bend generated in the flexible plate and is constituted by a piezoelectric body and at least one pair of electrodes. Incidentally, a piezoelectric material includes an electrostrictive material in the present invention. As a material for the piezoelectric body, there is suitably used a piezoelectric ceramic material having an excellent piezoelectric property. Alternatively, there may be used a high-molecular piezoelectric material.

In the sensor 1, the flexible plate 6A has an inclined strength by controlling thickness so that it becomes stronger from the central portion C between the outer periphery of the operating member 2 and the inner periphery of the supporting base 3 toward the outer periphery of the operating member 2 as shown by the arrow K1 and toward the inner periphery of the supporting base 3 as shown by the arrow K2. In the present invention, strengthening of an inclined mechanical strength of a flexible plate is called as inclined high strengthening.

With regard to the inclined thickness of the flexible plate for such inclined high strengthening, the flexible plate of the sensor 1 may partially include a portion where the thickness is constant like a periphery of the central portion C of the flexible plate 5A as long as the flexible plate 5 does not include a portion which becomes thinner along the directions shown by the arrows K1 and K2. It is not necessary that the flexible plate 5A becomes stronger from the central portion C of the flexible plate 5A toward the outer periphery of the operating member 2 and/or toward the inner periphery of the supporting base 3. The flexible plate 5A may become stronger from an arbitrary position between the outer periphery of the operating member 2 and the inner periphery of the supporting base 3.

Figure 16A:
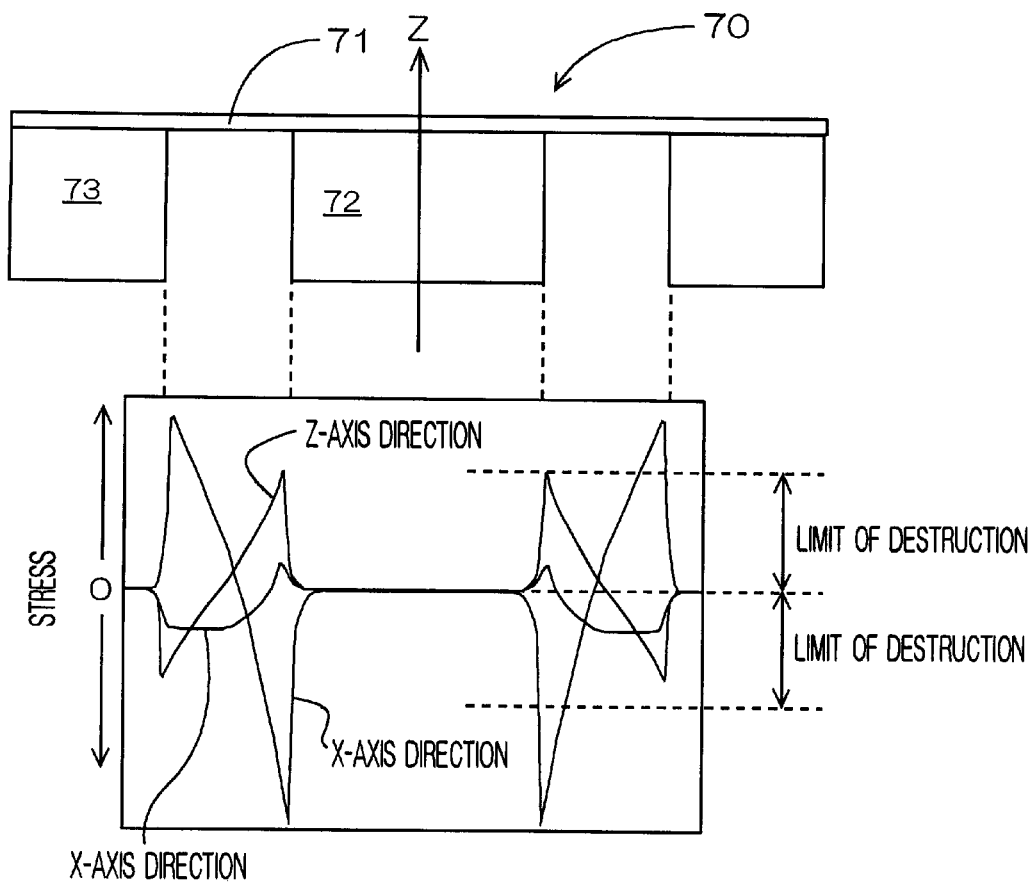
FIG. 16(a) is an explanatory view showing an embodiment of results of FEM simulation of stress generated in a piezoelectric body in a conventional force sensor.

As shown in the results of the FEM simulation shown in FIGS. 16(a)(b), since a stress generated at a boundary of the flexible plate and the operating member is different from that at a boundary of the flexible plate and the supporting base, it is not necessary to give inclined strength of the flexible plate toward both the outer periphery of the operating member and the inner periphery of the support base from an arbitrary position between the outer periphery of the operating member and the inner periphery of the supporting base. However, it is preferable to give inclined strength in both of the directions in view of improving reliability. In the present invention, the basic point of inclination of the strength is set at the center between the outer periphery of the operating member and the inner periphery of the supporting base, and the inclined strength is given toward both the outer periphery of the operating member and the inner surface of the supporting base from the basic position to clarify and simplify the point of the present invention. However, it should be understood that the point of the present invention is not limited to these modes.

Since it is considered that a distribution of stress generated in the piezoelectric element corresponds to a magnitude of stress generated in the flexible plate, if the results of FEM simulation shown in FIGS. 16(a)(b) is taken into account, it can be considered that stress generated in the flexible plate 5A becomes largest at boundaries 7A·8A of the flexible plate 5A and the operating member 2 and the supporting base 3. Since mechanical strength of the boundaries 7A·8A is increased by increasing the thickness, the maximum value of the generated strictive strain can be lowered. On the other hand, since the central portion C of the flexible plate 5A is maintained to be thin, the central portion C has a structure that it easily bends due to a displacement of the operating member 2.

Figure 16B:
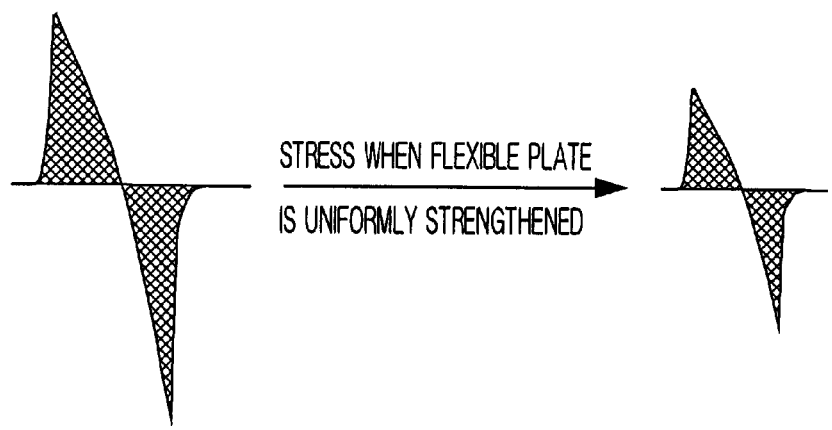
FIG. 16(b) is an explanatory view showing a state of lowering of stress when a flexible plate is uniformly strengthened.

That is, in the sensor 1, stress is generated in a wide range so that the flexible plate 5A bends as a whole. On the other hand, the maximum value of stress generated at the boundaries 7A·8A becomes smaller. A distribution of generation of this stress is reflected in the piezoelectric element. If this state is shown by drawing in FIG. 2 in the same manner as in FIG. 16(b), a stress curve (left side) has the aforementioned form of peak in a state that a flexible plate not having inclined strength has a constant thickness, while the peak value is lowered and the tip of the peak of a stress curve is rounded (right side) in the case that the flexible plate having the inclined strength is used. This makes it possible that a fracture is suppressed by lowering the maximum peak value without lowering an area given by the stress curve, that is, without lowering detecting sensitivity.

Thus, since the sensor 1 of the present invention can generate a desired bend in the flexible plate 5A, detecting sensitivity is not lowered. Further, since the maximum stress generated at the boundaries 7A·8A between the flexible plate 5A and the operating member 2 and between the flexible plate 5A and the supporting base 3, the sensor 1 hardly breaks. Therefore, the sensor 1 has excellent properties of high sensitivity and high reliability.

The inclination of the thickness of the flexible plate 6A in the sensor 1 is continuously formed, and thereby it is expected that a distribution of stress continuously changes and concentration of stress is preferably avoided. The boundaries 7A·8A between the flexible plate 5A and the operating member 2 and between the flexible plate 6A and the operating member 3 are preferably formed to have an obtuse angle in the sensor 1, which hardly has a stress concentration in comparison with the structure using a conventional flexible plate having a constant thickness with an angle of the boundaries being 90°.

Next, FIGS. 3–8 show enlarged sections of the flexible plate of another embodiment of a sensor in the present invention. These FIGS. 3–8 show sensors in which only flexible plates are varied in shape in the sensor 1 shown in FIGS. 1(a)(b). The state of disposition of the piezoelectric element 6 and shapes of the operating member 2 and the supporting base 3 are the same as those of the sensor 1. The basic structure is the same as that shown on the left side of FIGS. 1(a)(b).

The flexible plate 5B shown in FIG. 3 has the same inclination of thickness as the flexible plate 5A in the sensor 1 in FIG. 1. A curvature is arranged in each of the boundaries 7B·8B between the operating member 2 and the supporting base 3 so that dispersibility of stress at the boundaries 7B·8B is improved. By this, further improvement in reliability is planned. Incidentally, it is not necessary that the boundaries 7B·8B has the same radius of curvature, and they may be formed so as to have different curvatures.

Figure 4:
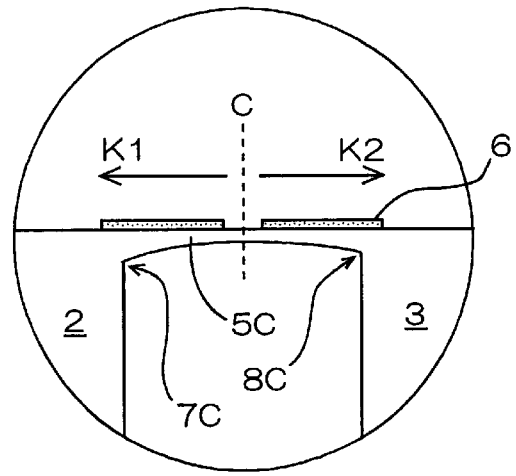
FIG. 4 is a sectional view showing still another embodiment of a structure of a flexible plate in a force sensor of the present invention.

In the flexible plate 5C shown in FIG. 4, the inclination of thickness in the direction shown by the arrow K1 from the central portion C between the outer periphery of the operating member 2 and the inner periphery of the supporting base 3 toward the outer periphery of the operating member 2 is different from that in the direction shown by the arrow K2 from the central portion C toward the inner periphery of the supporting base 3. Thus, a thickness of the flexible plate 5C may be changed at the boundaries 7C·8C between the flexible plate 5C and the operating member 2 and between the flexible plate 5C and the supporting base 3. Incidentally, it is needless to say that the boundaries 7C·8C may have a curvature as the boundaries 7B·8B shown in FIG. 3 through the boundaries 7C·8C are formed to have obtuse angle.

Figure 5:
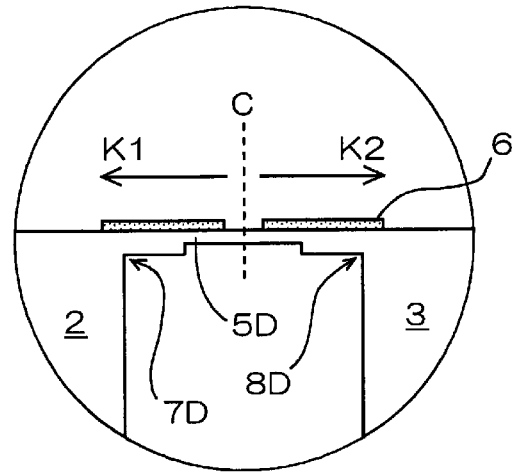
FIG. 5 is a sectional view showing yet another embodiment of a structure of a flexible plate in a force sensor of the present invention.

As shown by the aforementioned flexible plates 5A–5C, it is preferable that the thickness inclination is continuously formed. However, it may formed in tiers. The flexible plate 5D shown in FIG. 5 shows an embodiment in which an intermediate portion between the operating member 2 and the supporting base 3 is formed to be thin, and portions in the side of the operating member 2 and in the side of the supporting base 3 was formed to be thick. In the case of this embodiment, since the boundaries 7D·8D are formed to have a right angle though the maximum stress generated at the boundaries 7D·8D between the flexible plate 5D and the operating member 2 and between the flexible plate 5D and the supporting base 3 is reduced, it cannot be denied that the flexible plate is inferior to the aforementioned flexible plates 5A–5C in effect of stress dispersion. However, the inclined thickness in tiers as in the flexible plate 5D can be made by the following green sheet lamination technique which is excellent in productivity.

The green sheet lamination technique has an advantage of being capable of easily increasing the number of differences in level which changes thickness of the flexible plate. When the flexible plate 5E is used, the thickness of the flexible plate is formed in tiers if it is seen microscopically, and the boundaries 7E·8E between the flexible plate 5E and the operating member 2 and between the flexible plate 5E and the supporting base 3 has a right angle. However, the boundaries 7E·8E can be considered to be formed to have an obtuse angle since the change in thickness of the flexible plate 5E is close to a continuous change macroscopically. This can give a flexible plate equal to the aforementioned flexible plate 5A–5C in bending property, reducing property of the maximum stress, dispersion property of the stress, etc.

Figure 7:
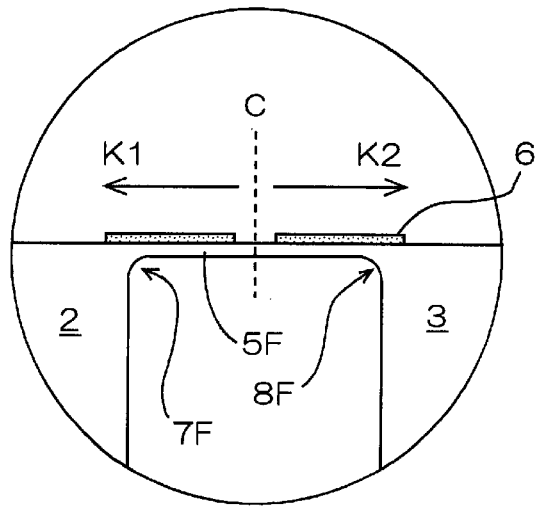
FIG. 7 is a sectional view showing yet another embodiment of a structure of a flexible plate in a force sensor of the present invention.

As a method for reducing the maximum stress generated in the flexible plate without changing thickness in any portion of the flexible plate and lowering detection sensitivity, there is a method in which a boundary between a flexible plate and an operating member and/or a flexible plate and a supporting base is formed to have a curvature. A flexible plate 5F shown in FIG. 7 shows its embodiment. The boundaries 7F and 8F between the flexible plate 5F and the operating member 2 and between the flexible plate 5F and the supporting base 3 are formed to have a curvature in the shape of an arc. In almost all portions of the flexible plate 5F is maintained to have a thin plate-like shape. The boundaries 7F and 8F may be formed to have so as to have different radiuses of curvature. Though such a curvature may be formed in only one of the boundaries 7F and 8F in consideration of the magnitude of stress generated in each of the boundaries 7F and 8F, it is preferable to form a curvature to each of the boundaries 7F and 8F in view of improving reliability.

Figure 8:
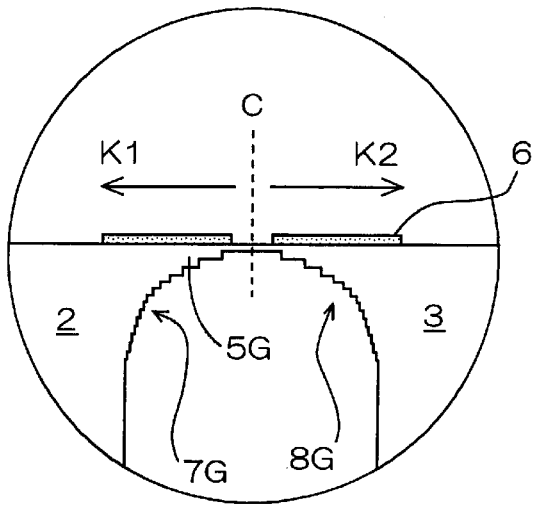
FIG. 8 is a sectional view showing yet another embodiment of a structure of a flexible plate in a force sensor of the present invention.

It is also possible to form the boundaries 7F·8F in tiers as the flexible plates 5E·5F, which have varied thickness in tiers, can be used for the flexible plates 5A–5C, which have continuously changed thickness. The boundaries 7G·8G between the flexible plate 5G shown in FIG. 8 and the operating member 2 and between the flexible plate 5G shown in FIG. 8 and the operating member 2 and between the flexible plate 5G and the supporting base 3 are formed in tiers microscopically. However, it can be regarded to have a constant curvature of radius macroscopically, and it can exhibit properties equal as those using the flexible plate 5F. As shown in FIG. 8, the curvature of radius at the boundaries 7G·8G may be made larger so that the flexible plate 5G has less area where the thickness is constant. It is possible to apply such a design of a curvature of radius to FIG. 7, too.

Figure 9:
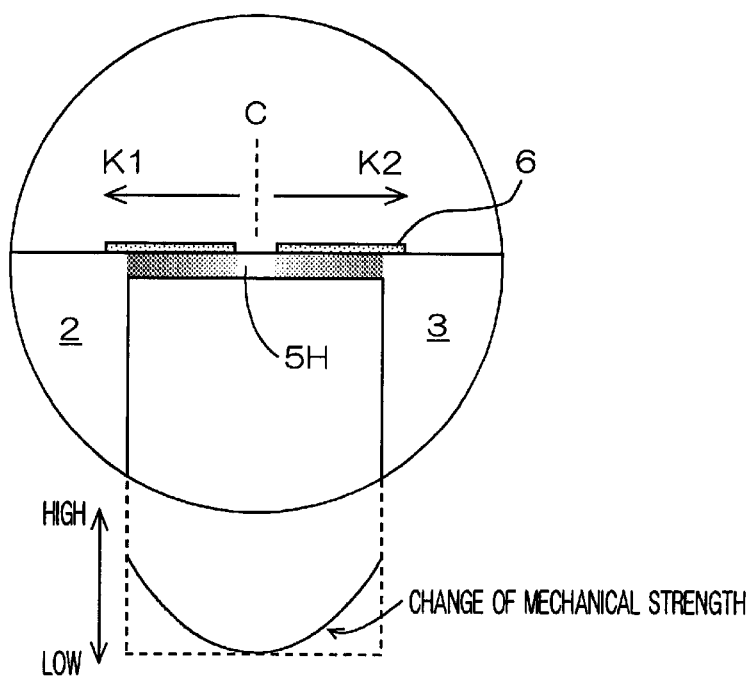
FIG. 9 is an explanatory view showing the states of inclined composition and inclined strength of a flexible plate in a force sensor of the present invention.

Then, the inclined strengthening of a flexible plate of the present invention may be conducted by inclining a composition of the flexible plate from the central portion between the outer periphery of the operating member and the inner periphery of the supporting base toward the outer periphery of the operating member and/or toward the inner periphery of the supporting base. FIG. 9 is a schematic view showing a composition inclination. The flexible plate 5H is designed to become mechanical strength higher from the central portion C of the flexible plate 5H toward the outer periphery of the operating member 2 as shown by the arrow K1 and toward the inner periphery of the supporting base 3 shown by the arrow K2. Incidentally, the upper figure of FIG. 9 shows the same one as the figure on the right of FIGS. 1(a)(b) and FIGS. 3–8.

In this case, the flexible plate may have a plate-like shape having a constant thickness. Alternatively, the thickness of the flexible plate is variously changed, and further the composition may be inclined. Conditions of inclination of the composition, that is, conditions of a change in a mechanical strength may be different between the K1 direction and the K2 direction, It is not necessary to make a smooth curve of change, and the change may be in tiers.

Though an embodiment of a force sensor of the present invention has been described, it is preferable that at least one of the operating member, the supporting base, and the flexible plate has a different chemical composition from that of the others with unitarily forming the operating member, the supporting base, and the flexible plate. For example, even in the case that a flexible plate has thickness inclination, it is preferable to use a flexible plate having high flexibility, an operating member and a supporting base each having a composition having high rigidity. It is also preferable, in the case that a composition of the flexible plate is inclined, that a composition of the operating member and/or the supporting base is different from that of the flexible plate, and further an inclined composition is given to the flexible plate.

When an unitary molding is conducted, it is possible to improve reliability by getting rid of joint portions of each member and to distinguish properties of the flexible plate which requires flexibility from the operating member and the supporting base both of which require high rigidity so as to satisfy each of the required properties. Incidentally, a method for controlling properties of the flexible plate, or the like, by such a chemical composition is useful even in the case of unitary molding using metals and synthetic resins besides ceramics to be most suitably used in the present invention. A specific chemical composition for a flexible plate will be described later.

Further, there may be employed a method in which strength of a flexible plate is partially enhanced by increasing hardness in a portion of a piezoelectric member (piezoelectric element) formed on a part of a surface (regardless of the upper or the lower surface) or the whole upper surface of the flexible plate in comparison with the other portions by applying, printing, or spraying a hardener of, for example, epoxy resin. When such a method is applied to a piezoelectric element, it may be used together with inclined high strengthening due to an inclination of thickness and/or an inclination of a composition of the flexible plate. Further, it is also possible to give a curvature at a boundary between the flexible plate and the operating member and/or between the flexible plate and the supporting base by applying such a hardener or to give a pseudo inclination of thickness of the flexible plate by a hardner.

Subsequently, a description is made on a method for producing a sensor in the case that thickness of the flexible plate is varied. A sensor of the present invention can be produced by joining with an adhesive, or the like, the members being independently made of various kind of materials. Alternatively, various kinds of materials may be applied on the flexible plate having a certain thickness. However, such a method requires a precise processing, for example, providing the flexible plate with various changes in thickness, and since the number of members is increased, production processes are prone to become complicated. Further, since a joint portion is formed between each gap of the members, it has a problem in reliability.

Therefore, in the present invention, a flexible plate having continuous change in thickness and being made of ceramic material is preferably made by one of press molding, extrusion molding, and injection molding. These methods are hereinbelow described.

Figure 10:
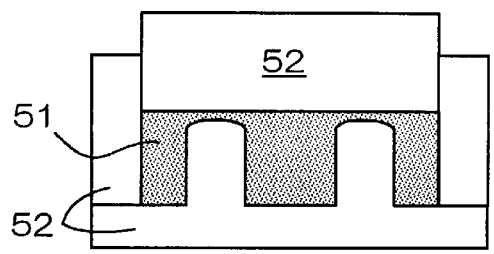
FIG. 10 is an explanatory view showing an embodiment of a method for producing a force sensor of the present invention.

When press molding is employed, a unitarily formed body can be obtained by press molding a powder 51 prepared by granulating a predetermined ceramic powder with a binder or the like being added thereto and filled into a mold 52 as shown in FIG. 10. It is possible to provide the flexible plate with an inclined thickness by arranging an inclination at a predetermined site of the mold 52. The obtained formed body is subjected to firing, and then provided with a piezoelectric element, etc., to give a sensor.

Incidentally, it is important to fill the powder 51 so as to be pressed uniformly when it is formed because the mold has a complex shape. It is preferable in consideration of production processes that the flexible plate is formed to have a thin thickness in total in anticipation of firing shrinkage from the time of molding. In this case breakage upon molding is prone to be caused. Therefore, a flexible plate may be formed to be thicker than necessary as a product and adjusted the thickness by polishing, or the like, after being fired.

When extrusion molding is employed, a columnar body is formed in accordance with a shape of the outer periphery of the supporting base and cut to have a predetermined length. In this green conditions, the flexible plate is subjected to processing so as to have a predetermined inclined thickness with forming an operating member. The obtained processed body is fired to give a unitary sensor. Alternatively, a green columnar body may be calcined so as to have a strength by which the body can bear mechanical processing and with which mechanical processing can be easily conducted, and the obtained calcined body may be machined, and then fired. Incidentally, the piezoelectric element may be formed either before or after the firing process.

The aforementioned press molding can also give the same columnar body as in the extrusion molding. However, the processing of a green press-molded body is prone to bring about detachment of powders because it includes little binder, and therefore, a precision in processing is apt to be lowered. Therefore, it is preferable to conduct machine processing after calcination.

Needless to say, injection molding is a method in which a ceramic material mixed with a thermoplastic resin is filled into a heated mold, and then the mold is cooled down to give a unitarily formed body which is subjected to binder-removing and then firing to give a sensor. Though this method can make a dimensional preciseness excellent and hardly need postprocessing, the cost of equipment, such as a production cost of an injection molding machine proper and the mold, is high.

When a metallic material is used for a sensor, any of the aforementioned press molding, extrusion molding, and injection molding can be employed in the same manner as long as a powder metallurgy technique is used. When a resin material is used, a mold has less abrasion even if extrusion molding is employed unlike the case of using a ceramic material, and therefore, it is suitably used.

Then, a method for producing a sensor in which the flexible plate has a change in thickness in tiers and a ceramic material is used. Here is suitably adopted a method to form an operating member, a supporting base, and a flexible plate by unitarily firing by a green sheet lamination technique using a ceramic green sheet.

A green sheet is a thin plate-like sheet having a constant thickness and being produced by subjecting a slurry prepared by mixing a ceramic powder with a binder, solvent, plasticizer, etc., to slip casting such as doctor blading or calender rolling or by subjecting a material prepared by kneading a mixture of a ceramic powder and a binder, a solvent, and a plasticizer to extrusion molding, or the like. The sheet has properties of high plasticity, high workability, easy cutting, easy punching, and easy joining. Therefore, a plurality of green sheets each punched or cut to give a desired shape of a dislocation are piled up at a predetermined site, subjected to thermopressing, or the like, to have a unitary form, and fired, to obtain a unitarily formed sensor with the operating member, the supporting base, and the flexible plate being formed to have predetermined shapes. Such a method is hereinbelow referred to as "a green sheet lamination technique."

Figure 6:
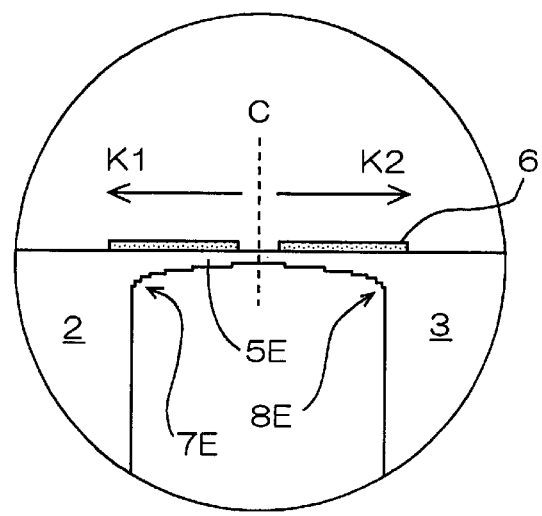
FIG. 6 is a sectional view showing yet another embodiment of a structure of a flexible plate in a force sensor of the present invention.
Figure 11:
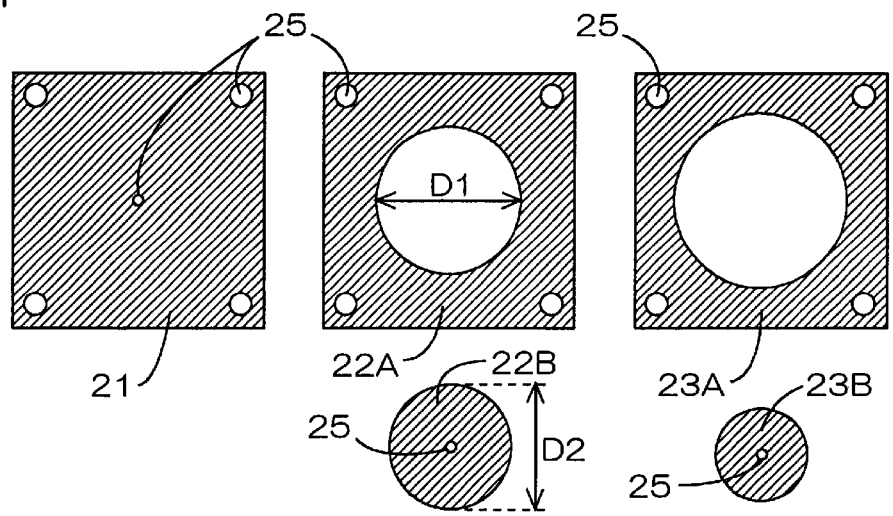
FIG. 11 is a plan view showing an embodiment of a shape of a green sheet used for a green sheet lamination technique.

For example, to produce a sensor using the flexible plate 5E having an inclined thickness in tiers as shown in FIG. 6, there is used a sheet member 21 provided with only a basic hole 25 for positioning upon piling up sheet members in forming the upper end surface of the flexible plate 5E as shown in FIG. 11, various sheet members 22A which becomes the supporting base 3 having different hole diameter D1 and various sheet members 22B which becomes the operating member 2 having different outer diameter D2 are piled up on the sheet member 21 so that the pore diameter D1 becomes larger concerning the sheet member 22A, and the outer diameter becomes smaller concerning the sheet member 22B, and finally, a plurality of sheet members 23A forming the main part of the supporting base 3 and a plurality of sheet members 23B forming the main part of the operating member 2 are unitarily piled up and fired so as to obtain a predetermined thickness.

Incidentally, a sheet member 21 subjected to multiple printing with various printing pattern may be used instead of a sheet member 22A and 22B so as to have the same conditions as in the case in which sheet members 22A and 22B are superposed on the sheet member 21.

Regarding a sensor in which a flexible plate having an inclined thickness in tiers is produced with using another material, a metallic sensor can be produced by adapting a technique of powder metallurgy. Additionally, a resin sensor can be produced by injection molding.

When such a green sheet lamination technique is used, since a sensor itself can be easily made thinner, each green sheet has excellent reproducibility in thickness and entire green sheets have excellent uniformity in thickness, it becomes easy to thin the flexible plate and precisely control thickness of the flexible plate. Therefore, a green sheet lamination technique can improve detecting sensitivity by forming the flexible plate to easily bend. Since the sensor has little variance in bending in each flexible plate or each portion of a flexible plate, there is little variance in properties among the obtained sensors.

Even if a thickness of a green sheet is controlled, or a green sheet having a constant thickness is used, thickness in each portion can be easily adjusted by suitably selecting the number of piled green sheets. That is, as in the case that the operating member, or the like, is independently produced, it is not necessary to produce members having various sizes for each designed shape. Thus, it is easy to balance detecting sensitivity in X-axial and Y-axial directions with detecting sensitivity in Z-axial direction adjusting a thickness of the operating member influential upon detecting sensitivity in X-axial and Y-axial directions by the number of piled green sheets, and it can reduce or save time for electrically correction by an electric circuit.

Further, thin plates each cut to have a sectional shape for each of the operating member, the supporting base, and the flexible plate are piled up, and it becomes possible to select a green sheet having different thickness for each member. Therefore, it becomes possible to use a green sheet properly, for example, a thin green sheet having high flexibility is used for the flexible plate, and a thick green sheet having high rigidity is used for the weight and the supporting base, and it becomes possible to obtain a sensor having high sensitivity and high precision with a flexible plate having high flexibility and an operating member and a supporting base each having high rigidity though it is unitarily formed.

When a green sheet lamination technique is used, many sheet parts can be obtained from a green sheet by punching with a mold, or the like. Therefore, the method has the advantages of being able to supply a sensor having excellent productivity and high precision at a low cost and to easily plan to shorten production processes by forming and unitarily firing the lower electrode, a piezoelectric body, and the upper electrode with a thick film technique such as screen printing, or the like, on a green sheet.

Next, a method for producing a sensor having a flexible plate subjected to inclined high strengthening by giving the flexible plate an inclination of composition. First, a formed body without composition inclination of the flexible plate is produced by aforementioned various methods in consideration of a shape of the flexible plate. Then, a different material source which becomes, for example, a titanium source is subjected to screen printing, slurry coating or the like in a portion of flexible plate, firing, and solid diffusion so as to obtain a sensor having a flexible plate having a composition inclination.

The similar effect can be obtained by sputtering, chemical vapor deposition, ion injection, or the like. When these methods are used, a fixed concentration inclination is sometimes generated because a material for each member is not completely divided due to solid dispersion among each members. Even in such a case, the sensor does not have a uniform chemical composition as a whole, and it is included in the present invention as long as properties of each member are controlled by the chemical composition.

Next, materials, etc., suitably used for each member in the case of using the aforementioned green sheet lamination technique are described. As a ceramic material constituting a green sheet, there is suitably a material having good sheet-moldability, high tenacity in a sintered body, high strength, and zirconia as a main component. Either stabilized zirconia or partially stabilized zirconia can be used.

Here, only the flexible plate is preferably made of a zirconia ceramic material containing 0.1–0.6 wt % of titanium in terms of $TiO_2$ and/or 0.05–0.1 wt % of magnesium in terms of MgO to give an excellent flexibility to the flexible plate. It becomes possible to increase flexibility of the ceramic flexible plate by containing Ti and/or Mg in the aforementioned range, while rigidity of the operating member and the supporting base can be increased by having a chemical composition outside the aforementioned range.

Figure 12:
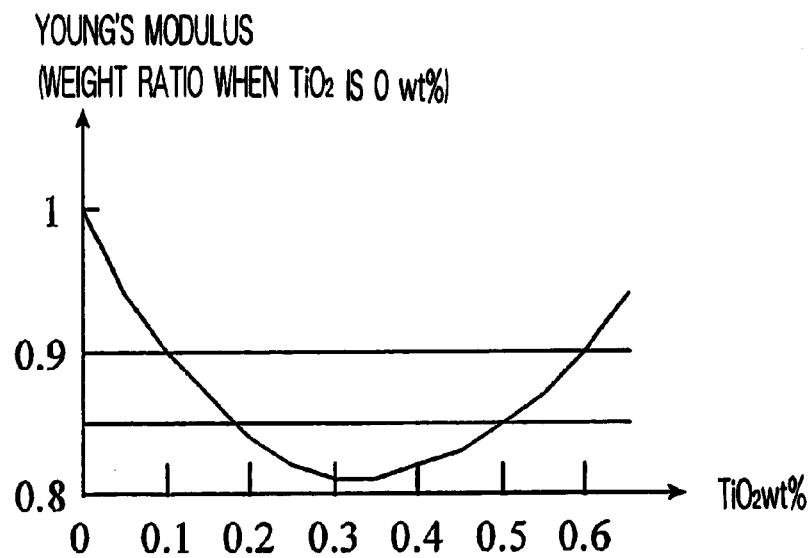
FIG. 12 is a graph showing a correlation between weight ratio of Ti and Young's modulus in a flexible plate.
Figure 13:
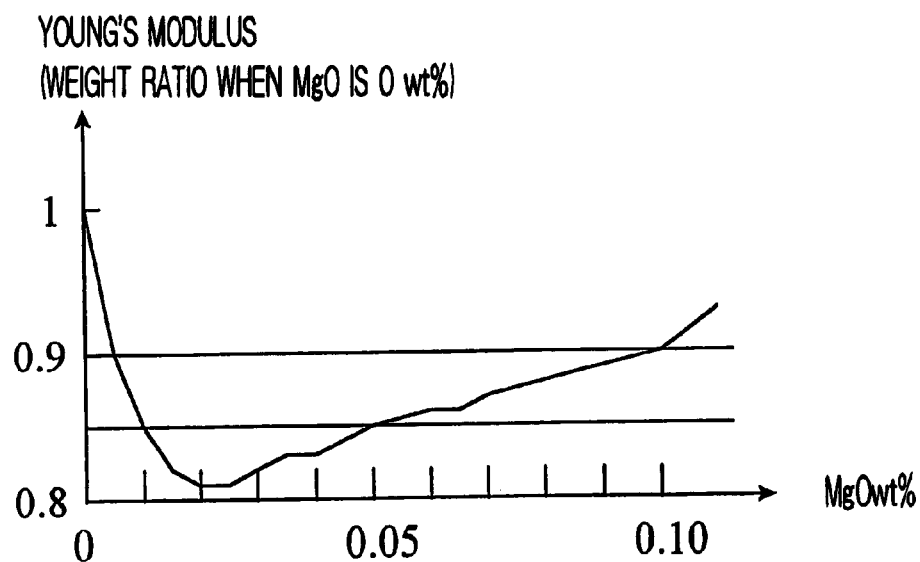
FIG. 13 is a graph showing a correlation between weight ratio of Mg and Young's modulus in a flexible plate.

FIGS. 12 and 13 are graphs each showing a correlation between weight ratio of Ti or Mg and Young's modulus in a flexible plate made of stabilized zirconia on the supposition that Young's modulus of the flexible plate not containing any of Ti and Mg is 1. As obvious from the graphs, when the weight ratio of Ti or Mg is within the aforementioned range, Young's modulus of the flexible plate becomes lowest and easily bend, and it is particularly preferable to contain 0.2–0.5 wt % of Ti in terms of $TiO_2$ and/or 0.01–0.5 wt % of Mg in terms of MgO.

When a weight ratio of Ti or Mg is lower than the aforementioned range, the flexible plate has low flexibility, and therefore, a sensitivity of a sensor is lowered. When a weight ratio of Ti or Mg is higher than the aforementioned range, tenacity of the flexible plate is lowered, the flexible plate is prone to break, and reliability of the sensor is lowered. This suggests that when the ratio is lower than the lower limit, tenacity of the operating member and the supporting base is not lowered, and addition of Ti, or the like, is preferably unnecessary.

When a green sheet lamination technique is employed, it is easy to design a sensor having sheet members each having an independent composition, it is possible to use various ceramic materials together in a range where a unitarily-laminated formed body can be unitarily fired, and it is easy to seek improvement in measurement sensitivity or reliability against mechanical breakage. Incidentally, the method for controlling properties of the flexible plate or the like by such a chemical composition is not limited to the case where a ceramic material is used, but available to the case of unitary molding using a metal or resin material.

There is used, for a piezoelectric body forming a piezoelectric element, a piezoelectric ceramic excellent in piezoelectric properties, such as lead zirconate titanate, lead magnesium niobate, and lead nikkel niobate. As an electrode material, there is preferably used Ag, Au, Pd, Pt, or an alloy thereof because they can be easily fired together with the piezoelectric body and it is easy to unitarily fire the flexible plate 5, or the like. Though it depends on production processes, various metallic materials such as Cu, Ni, and Al may be used for an electrode and an electrode lead. The electrode and the electrode lead can be suitably formed by screen printing, sputtering, or the like.

Incidentally, the piezoelectric body preferably has a porosity of 50% or less, and more preferably 20% or less. When a porosity is too high, it is difficult to obtain a sufficient piezoelectric/electrostrictive property. The porosity may be obtained form a rate of an area of pores to a visual area when a cross-section of the piezoelectric body is subjected to mirror plane polishing lest grains should be detached and observed using SEM, or the like.

Embodiments of a force sensor of the present invention have been described, in which a piezoelectric element is used as a detecting element and a basic position of inclined high strengthening is set at the central portion between the outer periphery of the operating member and the inner periphery of the supporting base of the flexible plate. However, the present invention is by no means limited to these embodiments. That is, properties of each of the embodiments may be combined respectively. It should be understood that various changes may be added to a shape, or the like, of each part as long as the changes do not deviate from the point of the invention. For example, a force sensor (three-axial sensor) having flexible plates having various shapes and compositions is disclosed in Japanese Patent Laid Open No. 10-332503. It is needless to say, in such a force sensor, a flexible plate can be subjected to inclined high strengthening, which is the main point of the present invention, or boundaries between the flexible plate and the operating member and between the flexible plate and the supporting base are provided with curvature.

Though, in the aforementioned embodiments, external forms (the upper surface and the lower surface) of the supporting base in the X-Y plane are square, the present invention is not limited to such a shape. Various forms can be employed, for example, a polygon such as a square, a circle, or an oval may be employed for both the external forms. Such selection of a form is also applied to a form of the operating member. Besides the aforementioned columnar shape, various forms such as a shape of a square pillar may be employed. Regarding a flexible plate, it should be understood that it is not necessary for the flexible plate to extend across over the hollow portion so as to completely seal the hollow portion, and thickness of the flexible plate may be partially varied for a purpose except for inclined high strengthening. For example, to vary thickness of the flexible plate not for inclined high strengthening by, for example, arranging a beam to the flexible plate does not influence on the inclined high strengthening of the present invention at all, and the flexible plate having a predetermined width may extend across over the hollow portion without completely seal the upper surface of the supporting base. Such a shape of each member may be suitably determined according to a selection of the number of detection direction of a force to be detected and a use of the sensor.

Further, a detecting element is not limited to a piezoelectric element, any detecting element can be used as long as it detects a displacement of the operating member bending generated in the flexible plate on the basis of the displacement of the operating member. For example, there may be used a detecting element using a change in electrostatic capacity, a detecting element using a change in piezo-resistance, etc. As a detecting element using a change in electrostatic capacity, there can be cited the one having a pair of electrodes provided on a surface of the flexible plate or the operating member, a dielectrics between these electrodes, and an electric circuit connected with the electrodes and detecting electrostatic capacity charged by an electric circuit. As a detecting element using a change in piezo-resistance, there can be cited elements represented by a strain gauge. Beside these elements, there can be cited a detecting element using a change in resistance due to expansion and contraction of a conductor.

As described above, according to a force sensor of the present invention, the flexible plate is subjected to inclined high strengthening, and boundaries between the flexible plate and the operating member and between the flexible plate and the supporting base are provided with curvature. Therefore, dispersion of stress is sought with the maximum stress generated in the flexible plate being reduced, thereby breakage of the flexible plate is avoided without causing a lowering of detection sensitivity. By this, a force sensor having high sensitivity and high reliability exhibits a remarkable effect. In addition, improvement in productivity can be sought with homogenizing properties of each sensor by using a green sheet lamination technique. Therefore, it has an excellent effect of providing a sensor having high precision at low cost.

What is claimed is:

1. A force sensor comprising:
a supporting base having an outer periphery, an inner periphery, and a hollow portion;
a flexible plate having at least one detecting element and extending across the hollow portion; and
an operating member having an outer periphery, an inner periphery, and suspended over the hollow portion by the flexible plate, the thickness of the flexible plate increasing from a position of which mechanical strength is lowest in the flexible plate between the outer periphery of the operating member and the inner periphery of the supporting base toward at least one of the outer periphery of the operating member and the inner periphery of the supporting base.

2. A force sensor according to claim 1, wherein the thickness of the flexible plate from said position of lowest mechanical strength toward the outer periphery of the operating member increases at a different rate than that of the flexible plate from said position of lowest mechanical strength toward the inner periphery of the supporting base.

3. A force sensor according to claim 1, wherein at least one of a boundary between the flexible plate and the operating member and a boundary between the flexible plate and the supporting base has curvature.

4. A force sensor according to claim 3, wherein the curvature of the boundary between the flexible plate and the operating member is different from that of the boundary between the flexible plate and the supporting base.

5. A force sensor according to claim 1, wherein the thickness of the flexible plate increases in tiers.

6. A force sensor according to claim 5, wherein the force sensor is produced using a green sheet lamination technique.

7. A force sensor according to claim 1, wherein said detecting element is a piezoelectric element.

8. A force sensor according to claim 1, wherein said operating member, said supporting base, and said flexible plate are unitarily formed, and at least one of them has a different chemical composition the others.

9. A force sensor according to claim 1, wherein only the flexible plate comprises a zirconia ceramic containing at least one of 0.1–0.6% by weight of titanium in terns of $TiO_2$ and 0.005–0.1% by weight of magnesium in terms of MgO.

10. A force sensor according to claim 9, wherein only the flexible plate comprises a zirconia ceramic containing at least one of 0.2–0.5% by weight of titanium in terms of $TiO_2$ and 0.01–0.05% by weight of magnesium in terms of MgO.

11. A force sensor according to claim 1, wherein a hardness of a part of the detecting element formed on a part of or an entire surface of the flexible plate is made higher in comparison with that of the other part by a hardening material.

12. A force sensor according to claim 1, wherein the force sensor is used as an acceleration sensor with using the operating member as a weight.

13. A force sensor comprising:
a supporting base having an outer periphery, an inner periphery, and a hollow portion;
a flexible plate having at least one detecting element and extending across the hollow portion; and
an operating member having an outer periphery, an inner periphery, and suspended over the hollow portion by the flexible plate, the composition of the flexible plate changing from a position of which mechanical strength is lowest in the flexible plate between the outer periphery of the operating member and the inner periphery of the supporting base toward at least one of the outer periphery of the operating member and the inner periphery of the supporting base.

14. A force sensor according to claim 13, wherein the composition of the flexible plate from said position of lowest mechanical strength toward the outer periphery of the operating member is different from that of the flexible plate from said position of lowest mechanical strength toward the inner periphery of the supporting base.

15. A force sensor according to claim 13, wherein said detecting element is a piezoelectric element.

16. A force sensor according to claim 13, wherein said operating member, said supporting base, and said flexible plate are unitarily formed, and at least one of them has a different chemical composition from the others.

17. A force sensor according to claim 13, wherein only the flexible plate comprises a zirconia ceramic containing at least one of 0.1–0.6% by weight of titanium in terms of $TiO_2$ and 0.005–0.1% by weight of magnesium in terms of MgO.

18. A force sensor according to claim 13, wherein a hardness of a part of the detecting element formed on a part of or an entire surface of the flexible plate is made higher in comparison with that of the other part by a hardening material.

19. A force sensor according to claim 13, wherein the force sensor is used as an acceleration sensor with using the operating member as a weight.

20. A force sensor comprising:
   a supporting base having a hollow portion,
   a flexible plate having at least one detecting element and extending across the hollow portion, and
   an operating member suspended over the hollow portion by the flexible plate;
   wherein at least one of a boundary between the flexible plate and the operating member and a boundary between the flexible plate and the supporting base has curvature, wherein the curvature of the boundary between the flexible plate and the operating member is different from that of the boundary between the flexible plate and the supporting base.

21. A force sensor according to claim 20, wherein only the flexible plate comprises a zirconia ceramic containing at least one of 0.2–0.5% by weight of titanium in terms of $TiO_2$ and 0.01–0.05% by weight of magnesium in terms of MgO.

22. A force sensor according to claim 20, wherein said operating member, said supporting base, and said flexible plate are unitarily formed, and at least one of them has a different chemical composition from the others.

23. A force sensor according to claim 20, wherein only the flexible plate comprises a zirconia ceramic containing at least one of 0.1–0.6% by weight of titanium in terms of $TiO_2$ and 0.005–0.1% by weight of magnesium in terms of MgO.

24. A force sensor according to claim 20, wherein said detecting element is a piezoelectric element.

25. A force sensor according to claim 23, wherein a part of the detecting element includes a hardening material that makes the hardness of said part higher than that of a remaining portion of the detecting element.

26. A force sensor according to claim 20, wherein the force sensor is used as an acceleration sensor with the operating member acting as a weight.

27. A force sensor comprising:
   a supporting base having a hollow portion,
   a flexible plate having at least one detecting element and extending across the hollow portion, and
   an operating member suspended over the hollow portion by the flexible plate;
   wherein at least one of a boundary between the flexible plate and the operating member and a boundary between the flexible plate and the supporting base has curvature, and said boundary is formed in tiers.

28. A force sensor according to claim 27, wherein said detecting element is a piezoelectric element.

29. A force sensor according to clam 27, wherein said operating member, said supporting base, and said flexible plate are unitarily formed, and at least one of them has a different chemical composition from the others.

30. A force sensor according to claim 27, wherein only the flexible plate comprises a zirconia ceramic containing at least one of 0.1–0.6% by weight of titanium in terms of $TiO_2$ and 0.005–0.1% by weight of magnesium in terms of MgO.

31. A force sensor according to claim 30, wherein only the flexible plate comprises a zirconia ceramic containing at least one of 0.2–0.5% by weight of titanium in terms of $TiO_2$ and 0.01–0.05% by weight of magnesium in terms of MgO.

32. A force sensor according to claim 27, wherein a part of the detecting element includes a hardening material that makes the hardness of said part higher than that of a remaining portion of the detecting element.

33. A force sensor according to claim 27, wherein the force sensor is used as an acceleration sensor with the operating member acting as a weight.

* * * * *